Oct. 21, 1969  H. J. HALL ETAL  3,473,874
OPTICAL GATES
Filed Aug. 16, 1966

United States Patent Office 3,473,874
Patented Oct. 21, 1969

3,473,874
OPTICAL GATES
Henry J. Hall and Arthur E. Rodda, Harlow, Essex, England, assignors to Newman & Guardia Limited, a British company
Filed Aug. 16, 1966, Ser. No. 572,819
Claims priority, application Great Britain, Aug. 19, 1965, 35,640/65
Int. Cl. G03b 27/68, 27/62, 1/48
U.S. Cl. 355—52
12 Claims

ABSTRACT OF THE DISCLOSURE

An optical gate for a cinematographic film copying apparatus having elongated film supports extending lengthwise of a film passage and transparent elements forming side walls of the passage to transmit light travelling along the optical axis. The space between the transparent elements conducts a liquid having a refractive index substantially equal to that of the film to reduce the defects in the projected image caused by irregularities in the film surface.

This invention relates to optical gates for cinematographic film copying apparatus.

A copy of a cinematographic film can be made by driving the film through an optical projection apparatus so that frames of the film are sequentially disposed on the optical axis of the apparatus and images thereof projected on to the light sensitive surface of a copy film driven through the apparatus in synchronism with the original. The copy film may be of the same type as the original or of the opposite type, e.g. a positive or a negative copy can be made from a negative original film. Further, the copy film may be of the same size as the original, or an enlargement, or, most frequently, of reduced size in order to economize on the amount of copy film required. For instance, many libraries possess stock of old 35 mm. film which it is desirable to copy on to 16 mm. film.

If the surface of an original film is scratched or worn these irregularities cause defects in the image projected on the copy film.

The present invention includes an optical gate for a cinematographic film copying apparatus wherein film is driven along a predetermined path within which frames of the film are sequentially disposed on the optical axis of an optical projection system and images thereof projected on to a light sensitive surface of a copy film, the gate comprising a housing formed with a passage defining the said path for film, transparent elements which form respective facing side walls of the passage at a predetermined location on the film path, the housing being adapted to transmit light travelling along the said optical axis through the said elements and a frame of a film disposed between the elements, and conduit means so arranged that a liquid having a refractive index equal to, or substantially equal to, the refractive index of the film material can be caused to flow along the passage and fill, or substantially fill, the space between each transparent element and a frame whose image is being projected, whereby defects in the projected image due to irregularities in the film surface are reduced.

The invention also includes an optical gate for a cinematographic film copying apparatus wherein film is driven along a predetermined path within which frames of the film are sequentially disposed on the optical axis of an optical projection system and images thereof projected on to a light sensitive surface of a copy film, the gate comprising a housing formed with a passage defining a path for film, transparent elements which form respective facing side walls of the passage at a predetermined location on the path, the housing being adapted, when disposed on the optical axis, to transmit light travelling along the axis through the said elements and a frame of a film disposed between the elements, inlet conduit means along which a liquid having a refractive index equal to, or substantially equal to, the refractive index of the film material can be supplied to the passage, and outlet conduit means along which the liquid may be withdrawn from the passage, the conduit means being so arranged that liquid flows along the passage, between the inlet and outlet conduit means, in the direction of film travel and the space between each transparent element and a frame between the elements is filled, or substantially filled with the liquid, whereby defects in the projected image due to irregularities in the film surface are reduced.

The apparatus may comprise further conduit means for the supply of gas under pressure to further inlet aperture means which open into the passage on the side of the liquid outlet conduit means remote from the transparent elements, whereby film is subjected to a flow of gas for drying purposes.

The invention also includes a method of forming a copy of a cinematographic film comprising driving a film along a passage formed in a housing so that frames of the film are sequentially disposed between transparent elements which respectively form facing side walls of the passage at a predetermined location thereon, providing a flow of liquid having a refractive index equal to or substantially equal to the refractive index of the film material along the passage so that the space between a frame and the said elements is filled or substantially filled with the said liquid, and projecting an image of the said frame on to a copy film.

The invention will now be described, by way of example, with reference to the accompanying drawings, in which.

Figure 1:
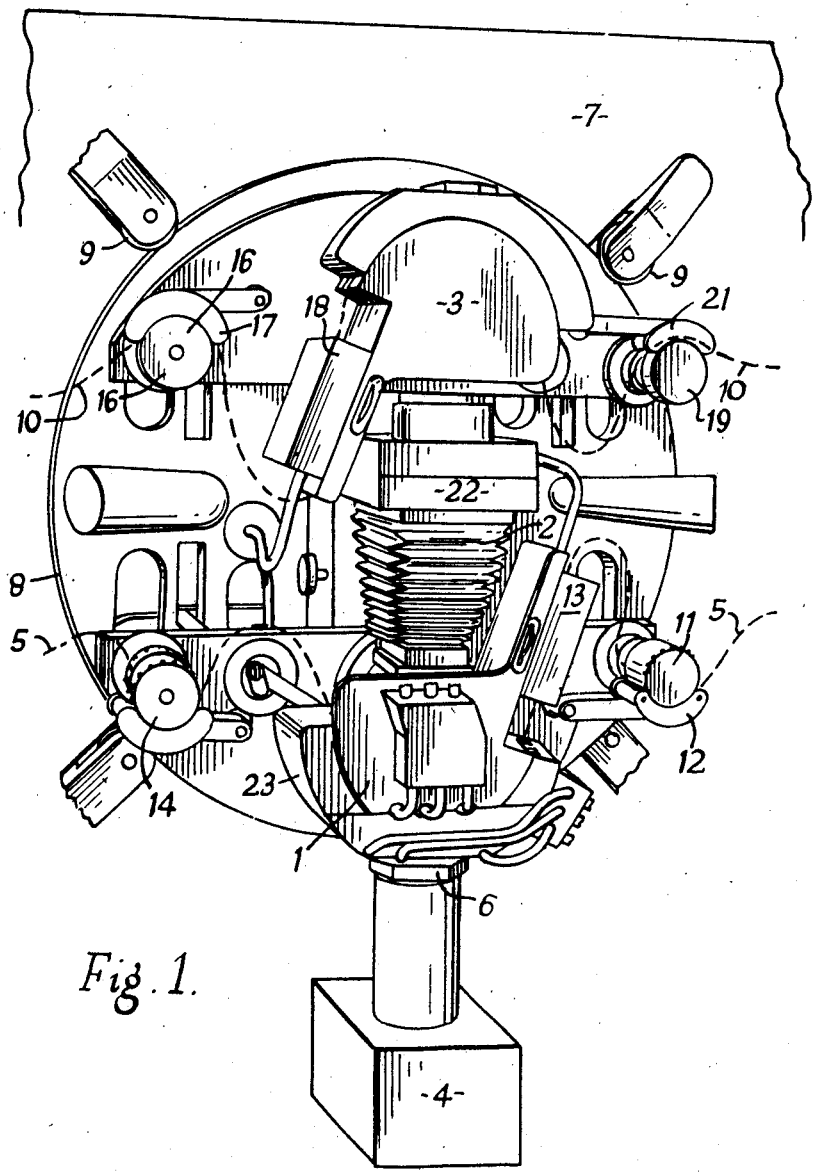
FIGURE 1 is a front elevation of an optical projection system and optical gates of a cinematographic projection apparatus according to the invention.

The cinematographic film copying apparatus illustrated in FIGURE 1 of the drawings is suitable for the production of copies which are enlargements or reductions of an original film and which may be of the same or opposite type. In this apparatus an optical gate 1 is disposed on the optical axis of an optical projection system 2 and copies are produced by driving an original film 5 through the gate 1 so that frames of the film are sequentially disposed on the axis and images thereof projected on to the light sensitive surface of a copy film 10, driven through a further gate 3 in synchronism with the original.

The optical projection system 2 is mounted on a control cabinet (not shown) of the copying apparatus and is arranged so that the optical axis of the system extends vertically upwards above the cabinet. The system 2 includes a lamp and an optical reflector which are mounted within a lamp housing 4 on the top of the cabinet, immediately above a central part of the cabinet which contains a power supply for the lamp. Above the lamp housing 4 is a condensing lens system 6 which, in conjunction with the reflector, serves to provide an upwardly directed, parallel beam of light from the lamp.

The rear wall of the control cabinet is extended upwardly above the top of the cabinet and serves as an upright support 7 for a turntable 8, which carries further parts of the optical projection system 2, and for supply and take-up spools for the original and copy films.

The turntable 8 is disposed in an upright plane and is mounted above the lamp housing 4 with its lower edge at approximately the same vertical location as the top of the condensing lens system 6. Four guide rollers 9 are disposed at equiangularly spaced locations around the periphery of the turntable 8 and serve to guide the turntable during rotation thereof about a horizontal axis extending normally of the upright support 7, for the purpose hereinafter described.

The optical gate 1 is secured to a lower part of the turntable 8, vertically above the condensing lens system 6, and the original film 5 is supplied to this gate from a supply spool (not shown) which is mounted on the upright support 7, to the right of the turntable, as viewed in FIGURE 1. Film travels from the supply spool to the gate 1 via a freely rotatable sprocket 11 and co-operating pressure shoe 12, which are mounted on the turntable 8, and a contact gate 13. After leaving the gate 1 the film 5 travels via a further sprocket 14 to a take-up spool (not shown) which is mounted on the support 7 to the left of the turntable 8.

At the top of the turntable 8 is the upper gate 3 for the copy film 10 which, in the present apparatus, is of similar construction to that of the lower gate 1 for the original. The copy film 10 is fed to the upper gate 3 from a supply spool (not shown) mounted on the support 7 to the left of the turntable 8, via a sprocket 16 and pressure-shoe 17 and a contact gate 18, and from the gate 3 the film travels via a sprocket 19 and pressure-shoe 21 to a take-up spool (not shown) on the right of the turntable, as viewed in FIGURE 1.

In a central position on the turntable 8 is a lens assembly 22 for projecting an image of a frame of the film 5 in the lower gate 1 onto a frame of the copy film 10 disposed in the upper gate 3.

Figure 2:
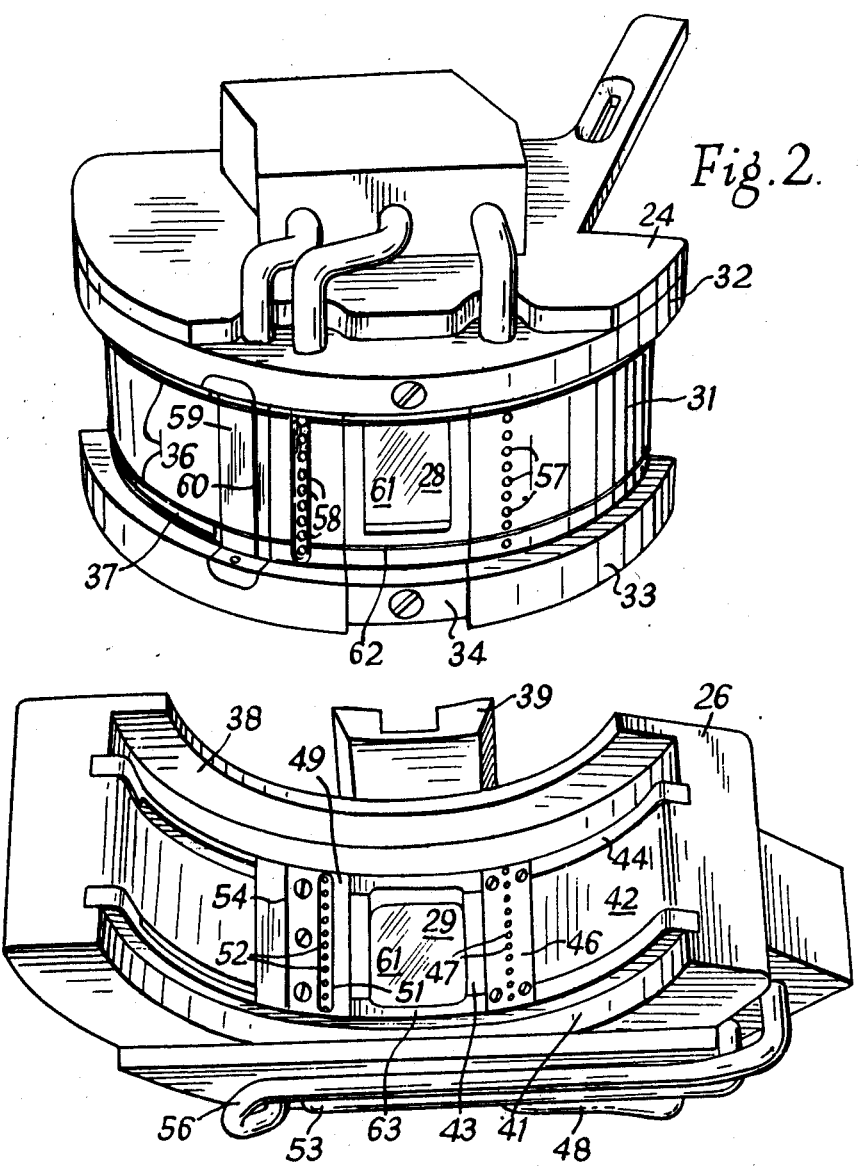
FIGURE 2 is an exploded, perspective view of an optical gate according to the invention which forms part of the apparatus of FIGURE 1.

Referring to FIGURES 1 and 2, the lower gate 1 for the original film 5 comprises a housing 23 made up of two parts, of which an upper part 24 is fixedly secured to the turntable 8 and a lower part 26 is mounted on a guide (not shown) which allows movement of the part 26 in a vertical direction relative to the upper part 24. In its upper position the lower part 26 engages the upper part 24 and with the two parts in engagement a narrow passage 27 for film extends through the housing between the two parts. This passage 27, which is shown in section in FIGURES 3 and 4, defines an arcuate film path through the housing 23, film travelling downwards as it enters the path on the right hand side of the housing, substantially horizontally as it crosses the optical axis of the projection system 2 at the centre of the housing and in an upwards direction as it emerges from the left hand side of the housing at the end of the path. The two parts 24 and 26 of the housing 23 are formed with light apertures 28 and 29, respectively, which are aligned on the optical axis of the projection system 2.

The upper part 24 of the gate housing 23 includes a hollow steel casting having a bottom wall 31 of part-cylindrical section, curved about an axis extending normally of the turntable 8, and upright front and rear walls 32 and 33, respectively, which, at their edges, extend radially outwardly of the bottom wall 31. A part-cylindrical mounting element (not shown), disposed co-axially of the bottom wall 31, is formed on the rear wall 33 and serves for securing the upper part 24 of the housing 23 to a boss on the turntable 8.

The bottom wall 31 of the upper part 24 of the gate housing 23 forms an upper side wall of the film passage 27 when the gate is assembled and an insert 34 provided in a lowermost, central section of this wall 31, and described in more detail hereinafter, contains the light aperture 28 of this part of the housing. On each side of the light aperture 28 the bottom wall 31 is formed with two, spaced, circumferentially extending runners 36 each of which projects 15 to 20 thousandths of an inch from the surface of the wall and in use of the gate 1 contacts film between a line of perforations and the frames thereon.

On the film outlet side of the light aperture 28 a circumferentially extending aperture 37 is formed in the bottom wall 31 between each runner 36 and the adjacent front or rear wall 32 or 33 of this part 24 of the housing 23. When the gate 1 is mounted on the turntable 8 a film driving mechanism (not shown) extends into the upper part 24 of the housing 23 and claw members of this mechanism extend through respective apertures 37 for engagement with perforations in the film 5.

The lower part 26 of the gate 1 is arcuate in section and is mounted on the turntable 8 with its concave side uppermost, facing the curved bottom wall 31 of the upper part 24. For mounting purposes a rear wall 38 of this lower part 26 is provided with a vertically extending guideway 39 which engages a guide (not shown) on the turntable 8 and, as mentioned above, permits movement of the part 26 in a vertical direction. The rear wall 38 extends radially inwardly of an upper face 41 of the part 26, towards the centre of curvature thereof, and the extended portion of this wall 38 fits behind the rear wall 33 of the upper part 24 of the housing when the gate is assembled.

The upper face 41 of the lower part 26 of the housing 23 is formed with a circumferentially extending, raised central portion 42 which forms a lower side wall of the film passage 27 when the gate 1 is assembled and an insert 43 provided in a lowermost, central section of the face 41, and described in more detail hereinafter, contains the light aperture 29 of this part of the housing. Extending along each side of the raised, central section 42, from each uppermost, side edge of the face to a location spaced from the central light aperture 29 is a steel runner 44 which projects approximately 8 thou. inches radially inwardly of the curved surface of section 42.

Figure 3:
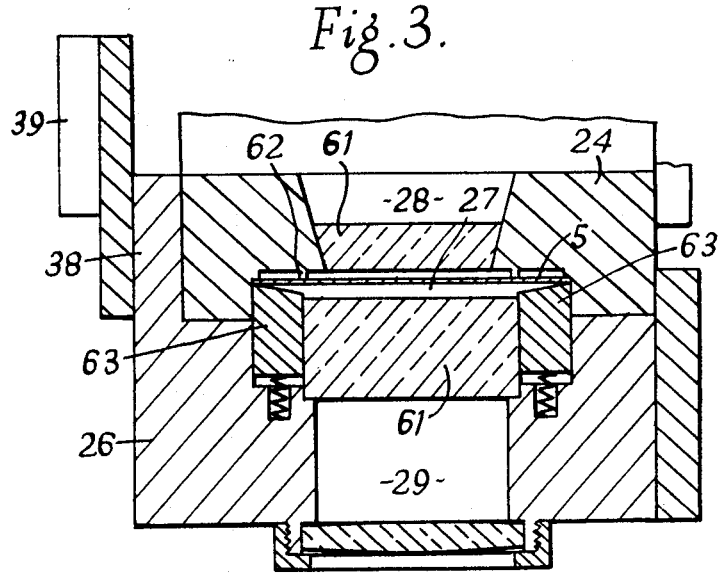
FIGURE 3 is a scrap sectional view of the gate of FIGURE 2, the section being taken along the optical axis of the gate.
Figure 4:
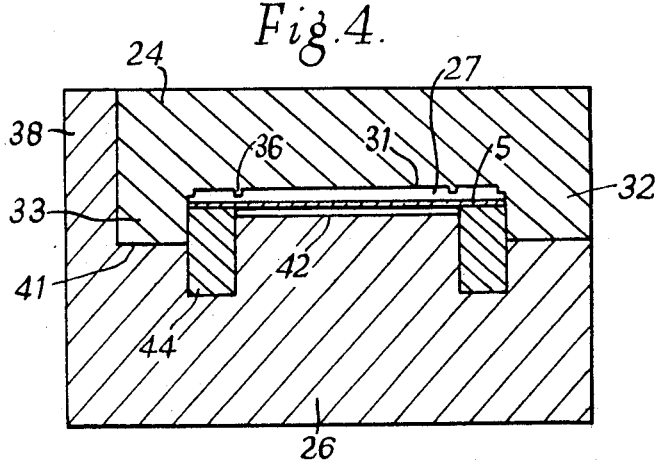
FIGURE 4 is a scrap sectional view of the gate of FIGURE 2, the section being taken substantially parallel with but spaced from the optical axis of the gate.

Referring to FIGURES 3 and 4, when the two parts 24 and 26 of the housing 23 are in engagement the projecting edge of the rear wall 33 of the upper part 24 engages the upper face 41 of the lower part 26, between a steel runner 44 and the projecting edge of the rear wall 38 thereof, and the projecting edge of the front wall 32 of the upper part 24 engages the upper face 41 of the lower part 26, between a steel runner 44 and the front of the part 26.

With the two parts 24 and 26 assembled in this manner each steel runner 44 in the lower part 26 of the housing 23 is spaced from the facing runner 36 on the upper part 24 by a distance approximately equal to twice the film thickness, thereby allowing for joints in the film.

As mentioned above, the steel runners 44 are spaced from the central light aperture 29 in the lower part 26 of the housing 23. Between this aperture 29 and the runners 44 on the inlet side of the housing the raised central section 42 of the lower part 26 of the housing is fitted with a stainless steel insert 46 which extends transversely across that section. A series of eleven, aligned inlet apertures 47 are formed in this insert 46, so that they extend across the lower side of the film passage 27 when the gate 1 is assembled, and these inlet apertures are connected by a conduit 48 to a liquid inlet on the outside of the housing 23 for the purpose hereinafter described.

On the film outlet side of the light aperture 29, between the aperture 29 and the steel runners 44, a further stainless steel insert 49 is fitted into the central section 42 of the lower part 26 of the housing. This insert 49 is formed with a recess 51 which extends across the central section 42 and in the bottom of which are eleven, aligned outlet apertures 52, connected via a conduit 53 to a liquid outlet. The insert 49 is also formed with a slit 54 which is disposed on the film outlet side of the outlet apertures 52 and extends across the raised, central section 42 at right angles to the direction of film travel. A conduit 56 connects the slit 54 to an air inlet on the outside of the housing 23.

The bottom wall 31 of the upper part 24 of the housing is also formed with two series of aligned apertures 57 and 58, respectively, which extend across its recessed, central section and face respective series of apertures 47 and 52 in the lower part 26 when the gate 1 is assembled. This upper part 24 is also provided with a stainless steel insert 59, formed with a slit 60 which faces the slit 54 in the lower part 26 of the housing.

Each of the central inserts 34 and 43 of the housing is fitted with a ground glass window 61 having one face which forms part of the side wall of the film passage 27 and is curved in accordance with the curvature of that passage and an opposed face which is flat. When the gate is assembled the two windows 61 are spaced apart by 18 thou. inches.

The central insert 34 in the upper part 24 of the housing 23 is formed with two, spaced runners 62, each of which connects together a pair of runners 36 on respective opposed sides of the insert 34. The central insert 43 in the lower part 26 of the housing is also provided with a pair of steel runners 63 similar to the above-mentioned steel runners 44 on the upper face 41 of this part of the housing. The steel runners 63 on the insert 43 are spring-loaded, however, and are urged radially inwardly towards the centre of the curvature of the upper face 41 so that film disposed between the two inserts 34 and 43 is gripped near each opposed edge thereof between a steel runner 63 and a facing part of the upper part 24 of the housing.

As mentioned above, a contact gate 13 is provided on the inlet side of the lower gate 1. This contact gate 13 is adopted to sense the exposure to which each frame of the film 5 has been subjected, in accordance with the sensed exposure, cause a pre-edited light mask to be disposed on the optical axis of the projection system 2 when the frame in question reaches that axis. This controls the amount of light passing through the frame in accordance with its exposure.

If it is desired to produce a 16 mm. copy of a 35 mm. film by means of the present apparatus the lower gate 1 is one which is adopted to receive 35 mm. film and the upper gate 3 is a similar gate adapted to receive 16 mm. film but having the central inserts 34 and 43 removed from each part of its housing. The lens assembly 22 is arranged to project a reduced image of a frame of film in the lower gate 1 on to a frame in the upper gate 3. On the other hand, if it is then desired to produce an enlarged, 35 mm. copy of a 16 mm. film the turntable 8 is rotated about its axis so that the 16 mm. gate is in the lower gate position and the 35 mm. gate at the top, central inserts 34 and 43 are provided in the 16 mm. gate, and the inserts removed from the 35 mm. gate. For other conversions it is, of course, necessary to change one or other of the gates.

In the use of the apparatus the lower part 26 of the lower gate 1 is moved downwardly away from the upper part 24 and the original film 5 wound on to the supply spool on the right hand side of the turntable 8. Film is then fed from the supply spool between the freely rotatable sprocket 11 and the associated pressure shoe 12, through the contact gate 13, round the curved bottom wall 31 of the upper part 24 of the gate housing and, finally, via the second sprocket 14 and shoe to the take-up spool on the left of the turntable 8. The lower part 26 of the gate 1 is then moved upwardly into engagement with the upper part 24, whereupon a section of the original film is disposed in the narrow passage 27 between the two parts 24 and 26 of the housing 23.

A copy film 10 is likewise fed through the upper gate 3 from the supply spool on the left of the turntable 8 to the take-up spool on the right.

The liquid inlets on the housing 23 of the lower gate 1 are now connected to a tank of trichlorethylene or other liquid of refractive index equal or approximately equal to the refractive index of the film material and the outlet apertures 52 and 58 are connected to a vacuum pump. A source of air under pressure is connected to the slits 54 and 61 in the upper and lower parts of the gate housing, on the outlet side of the light aperture.

The lamp of the optical projection system 2 is now switched on and the film drive mechanism is energised so that the original film 5 is driven through the lower gate 1 and the copy film 10 through the upper gate 3, drive to the films being synchronized so that a new frame of the copy film appears on the optical axis in the upper gate 3 as each succeeding frame of the original film is disposed on the axis in the lower gate 1.

Liquid supplied to the two series of inlet apertures 47 and 57 on the inlet side of the passage 27 in the lower gate 1 flows along this passage in the direction of film travel and on both sides of the film. This liquid flows across the ground glass windows 61 fitted into respective light apertures 28 and 29 on the optical axis of the projection system 2 and a large percentage of liquid is then drawn from the gate via the outlet apertures 52 and 58 on the outlet side of the film passage by means of a pump. Any liquid which still adheres to the film after passing the outlet apertures is then subjected to a flow of air from the air slits 54 and 61 in the sides of the passage 27, which tends to force liquid back towards the outlets 52 and 58, particularly liquid in the film perforations, and also effects some evaporation.

During the period that a frame of the original film 5 is disposed between the ground glass windows 61, on the optical axis, and an image thereof is being projected on to the copy film 10 the space between the film 5 and the windows 61 is filled with liquid. In particular, the liquid tends to fill scratches or other irregularities in the film surface. Accordingly, since the refractive index of the film material is equal or substantially equal to that of the liquid and of the ground glass windows 61, and since the outer faces of these windows 61 are flat and parallel with one another, the optical path length for light travelling parallel with the optical axis through any part of a frame is substantially the same. Defects in the projected image due to scratches or other surface irregularities are therefore considerably reduced.

We claim:

1. An optical gate for a cinematographic film copying apparatus wherein film is driven along a predetermined path within which frames of the film are sequentially disposed on the optical axis of an optical projection system and images thereof projected onto a light sensitive surface of a copy film, the gate comprising a housing formed with a passage defining the said path for film, elongated film support means which extend lengthwise of the passage and are adapted to engage peripheral parts of a film traversing the passage, whereby the frames of the film are spaced from facing side walls of the passage and scratching is reduced, transparent elements which form respective facing side walls of the passage at a predetermined location on the film path, the housing being adapted to transmit light travelling along the said optical axis through the said elements and a frame of a film disposed between the elements, and conduit means opening through facing side walls of the passage so that a liquid having a refractive index equal to, or substantially equal to, the refractive index of the film material can be caused to flow along the passage on each side of the film and fill, or substantially fill, the space between each transparent element and a frame whose image is being projected, whereby defects in the projected image due to irregularities in the film surface are reduced.

2. An optical gate for a cinematographic film copying apparatus wherein film is driven along a predetermined path within which frames of the film are sequentially disposed on the optical axis of an optical projection system and images thereof projected onto a light sensitive surface of a copy film, the gate comprising a housing formed with a passage defining a path for film, elongated film support means which extend lengthwise of the passage and are adapted to engage peripheral parts of a film traversing the passage, whereby the frames of the film are spaced from facing side walls of the passage and scratching is reduced, transparent elements which form respective facing side walls of the passage at a predetermined location on the path, the housing being adapted, when disposed on the optical axis, to transmit light travelling along the axis through the said elements and a frame of a film disposed between the elements, inlet conduit means opening through facing side walls of the passage along which a liquid having a refractive index equal to, or substantially equal to, the refractive index of the film material can be supplied to the passage, and outlet conduit means opening through facing side walls of the passage along which the liquid may be withdrawn from the passage, the conduit means being so arranged that liquid flows along the passage on each side of the film, between the inlet and outlet conduit means, in the direction of film travel and the space between such transparent element and a frame between the elements is filled, or substantially filled with the liquid, whereby defects in the projected image due to irregularities in the film surface are reduced.

3. An optical gate for a cinematographic film copying apparatus wherein film is driven along a predetermined path within which frames of the film are sequentially disposed on the optical axis of an optical projection system and images thereof projected onto a light sensitive surface of a copy film, the gate comprising a housing formed with a passage defining a path for film, transparent elements which form respective facing side walls of the passage at a predetermined location on the path, the housing being adapted, when disposed on the optical axis, to transmit light travelling along the axis through the said elements and a frame of a film disposed between the elements, inlet conduit means along which a liquid having a refractive index equal to, or substantially equal to, the refractive index of the film material can be supplied to the passage, and outlet conduit means along which the liquid may be withdrawn from the passage, the conduit means being so arranged that liquid flows along the passage, between the inlet and outlet conduit means, in the direction of film travel and the space between each transparent element and a frame between the elements is filled, or substantially filled with the liquid, whereby defects in the projected image due to irregularities in the film surface are reduced, said inlet and outlet means being respectively connected to inlet and outlet aperture means in the passage, each aperture means including two series of apertures on opposed side walls of the passage, respectively, and each series comprising a row of aligned apertures which extends transversely of the direction of film travel.

4. An optical gate as claimed in claim 3, wherein a pair of opposed side walls of the passage are each formed with an elongated recess which extends transversely of the direction of film travel and the two series of outlet apertures are formed at the bottom of respective recesses.

5. An optical gate for a cinematographic film copying apparatus wherein film is driven along a predetermined path within which frames of the film are sequentially disposed on the optical axis of an optical projection system and images thereof projected onto a light sensitive surface of a copy film, the gate comprising a housing formed with a passage defining a path for film, transparent elements which form respective facing side walls of the passage at a predetermined location on the path, the housing being adapted, when disposed on the optical axis, to transmit light travelling along the axis through the said elements and a frame of a film disposed between the elements, inlet conduit means along which a liquid having a refractive index equal to, or substantially equal to, the refractive index of the film material can be supplied to the passage, and outlet conduit means along which the liquid may be withdrawn from the passage, the conduit means being so arranged that liquid flows along the passage, between the inlet and outlet conduit means, in the direction of film travel and the space between each transparent element and a frame between the elements is filled, or substantially filled with the liquid, whereby defects in the projected image due to irregularities in the film surface are reduced, and further conduit means for the supply of gas under pressure to further inlet aperture means which open into the passage on the side of the liquid outlet conduit means remote from the transparent elements, whereby film is subjected to a flow of gas for drying purposes.

6. An optical gate as claimed in claim 5, wherein the further inlet aperture means comprise elongated apertures formed in opposed side walls of the passage, respectively, and each extending transversely of the direction of film travel.

7. An optical gate for a cinematographic film copying apparatus wherein film is driven along a predetermined path within which frames of the film are sequentially disposed on the optical axis of an optical projection system and images thereof projected onto a light sensitive surface of a copy film, the gate comprising a housing formed with a passage defining a path for film, transparent elements which form respective facing side walls of the passage at a predetermined location on the path, the housing being adapted, when disposed on the optical axis, to transmit light travelling along the axis through the said elements and a frame of a film disposed between the elements, inlet conduit means along which a liquid having a refractive index equal to, or substantially equal to, the refractive index of the film material can be supplied to the passage, outlet conduit means along which the liquid may be withdrawn from the passage, the conduit means being so arranged that liquid flows along the passage, between the inlet and outlet conduit means, in the direction of film travel and the space between each transparent element and a frame between the elements is filled, or substantially filled with the liquid, whereby defects in the projected image due to irregularities in the film surface are reduced, the sides of the transparent elements which face inwardly of the passage being shaped to define a curved path for film, the elements being formed of a material having a refractive index equal to, or substantially equal to that of the film material, and the sides of the elements remote from the passage being planer and extending normally of the optical axis, whereby the lengths of the optical paths through the elements, the film and the liquid for rays travelling parallel with the optical axis are substaintally equal.

8. An optical gate for a cinematographic film copying apparatus wherein film is driven along a predetermined path within which frames of the film are sequentially disposed on the optical axis of an optical projection system and images thereof projected onto a light sensitive surface of a copy film, the gate comprising a housing formed with a passage defining a path for film, transparent elements which form respective facing side walls of the passage at a predetermined location on the path, the housing being adapted, when disposed on the optical axis, to transmit light travelling along the axis through the said elements and a frame of a film disposed between the elements, inlet conduit means along which a liquid having a refractive index equal to, or substantially equal to, the refractive index of the film material can be supplied to the passage, and outlet conduit means along which the liquid may be withdrawn from the passage, the conduit means being so arranged that liquid flows along the passage, between the inlet and outlet conduit means, in the direction of film travel and the space between each transparent element and a frame between the elements is filled, or substantially filled with the liquid, whereby defects in the projected image due to irregularities in the film surface are reduced, one side wall of the passage being formed with two runners which extend parallel with the direction of film travel and being spaced transversely of that direction, each runner being adapted to support the film at a location between a frame and a series of perforations therein.

9. An optical gate for a cinematographic film copying apparatus wherein film is driven along a predetermined path within which frames of the film are sequentially disposed on the optical axis of an optical projection system and images thereof projected into a light sensitive surface of a copy film, the gate comprising a housing formed with a passage defining a path for film, transparent elements which form respective facing side walls of the passage at a predetermined location on the path, the housing being adapted, when disposed on the optical axis, to transmit light travelling along the axis through the said elements and a frame of a film disposed between the elements, inlet conduit means along which a liquid having a refractive index equal to, or substantially equal to, the refractive index of the film material can be supplied to the passage, and outlet conduit means along which the liquid may be withdrawn from the passage, the conduit means being so arranged that liquid flows along the passage, between the inlet and outlet conduit means, in the direction of film travel and the space between each transparent element and a frame between the elements is filled, or substantially filled with the liquid, whereby defects in the projected image due to irregularities in the film surface are reduced, runners being provided on one side wall of the passage, on respective opposed sides of one of the said transparent elements, and means being provided for biasing the runners into engagement with film so that the film is engaged at or near each edge thereof between one of the runners and a part of the opposed side wall of the passage.

10. Cinematographic film copying apparatus comprising an optical gate as claimed in claim 2, a further optical gate, an optical projection system having an optical axis which extends through the transparent elements of the housing of the said optical gate and through the further optical gate and which is adapted to project an image of a frame of a film disposed between the said transparent elements onto a frame of a copy film in the further optical gate.

11. A method of forming a copy of a cinematographic film comprising driving a film intermittently at high speed along a passage formed in a housing in a particularly direction of movement so that frames of the film are sequentially disposed between transparent elements which respectively form facing side walls of the passage at a predetermined location thereon, providing a flow of liquid on opposite sides of the film having a refractive index equal to or substantially equal to the refractive index of the film material along the passage in the direction of movement of the film so that the space between a frame and the said elements is filled or substantially filled with the said liquid, and projecting an image of the said frame onto a copy film.

12. A method as claimed in claim 11, comprising directing a flow of gas onto the film for drying frames after the projection of images therefrom.

References Cited
UNITED STATES PATENTS

| | | | |
|---|---|---|---|
| 2,842,865 | 7/1958 | Enkelmann | 95—94 X |
| 2,855,822 | 10/1958 | Fitter et al. | |
| 2,890,621 | 6/1959 | Suits. | |

NORTON ANSHER, Primary Examiner

WAYNE A. SIVERTSON, Assistant Examiner

U.S. Cl. X.R.

352—228; 355—75